United States Patent
Müller

(10) Patent No.: US 12,057,724 B2
(45) Date of Patent: Aug. 6, 2024

(54) METHOD FOR OPERATING A MOTOR VEHICLE CLOSING SYSTEM

(71) Applicant: Brose Fahrzeugteile SE & Co. Kommanditgesellschaft, Bamberg, Bamberg (DE)

(72) Inventor: Alexander Müller, Bischberg (DE)

(73) Assignee: Brose Fahrzeugteile SE & Co. Kommanditgesellschaft, Bamberg (DE)

( * ) Notice: Subject to any disclaimer, the term of this patent is extended or adjusted under 35 U.S.C. 154(b) by 123 days.

(21) Appl. No.: 17/791,296

(22) PCT Filed: Dec. 17, 2020

(86) PCT No.: PCT/EP2020/086867
§ 371 (c)(1),
(2) Date: Jul. 7, 2022

(87) PCT Pub. No.: WO2021/140003
PCT Pub. Date: Jul. 15, 2021

(65) Prior Publication Data
US 2023/0352955 A1 Nov. 2, 2023

(30) Foreign Application Priority Data
Jan. 9, 2020 (DE) .................... 10 2020 100 372.2

(51) Int. Cl.
*H02J 7/00* (2006.01)
*B60R 16/033* (2006.01)
(Continued)

(52) U.S. Cl.
CPC ............ *H02J 7/005* (2020.01); *B60R 16/033* (2013.01); *E05B 81/04* (2013.01); *E05B 81/82* (2013.01);
(Continued)

(58) Field of Classification Search
CPC ....... B60R 16/033; B60R 25/00; E05B 81/04; E05B 81/82; E05B 81/56; H02J 7/005; H02J 7/007; H02J 2310/48
See application file for complete search history.

(56) References Cited

U.S. PATENT DOCUMENTS

2007/0145821 A1* 6/2007 Mekky ................... E05B 81/54
307/10.1
2011/0031811 A1 2/2011 Park et al.
(Continued)

FOREIGN PATENT DOCUMENTS

CH 658915 A5 12/1986
DE 202013103042 U1 10/2014
(Continued)

OTHER PUBLICATIONS

Dictionary—Current Technical Terms from Computer Sciences and Telecommunications, 9th Edition, Zürich, VDF Hochschulverlag AG, 2007, p. 86. ISBN 978-3-7281-3108-9.

*Primary Examiner* — Nabil H Syed
(74) *Attorney, Agent, or Firm* — Dickinson Wright PLLC

(57) ABSTRACT

A method for operating a motor vehicle closing system including, activating, by a controller, an electric drive to perform a movement routine and a charging routine, in which a stored energy source is charged, determining, by a monitoring unit, a time dependency of a discharging variable of the stored energy source as the stored energy source is discharging energy, and triggering, by the monitoring unit, a safety routine for the stored energy source, in response to a specified fault criterion being satisfied by the time dependency of the discharging variable.

20 Claims, 2 Drawing Sheets

(51) Int. Cl.
*E05B 81/04* (2014.01)
*E05B 81/82* (2014.01)
*E05B 81/56* (2014.01)

(52) U.S. Cl.
CPC .............. *H02J 7/007* (2013.01); *E05B 81/56* (2013.01); *H02J 2310/48* (2020.01)

(56) References Cited

U.S. PATENT DOCUMENTS

| | | | |
|---|---|---|---|
| 2012/0268080 | A1 | 10/2012 | Jeon et al. |
| 2014/0339891 | A1* | 11/2014 | Ohkawa ................ H01M 10/44 |
| | | | 320/134 |
| 2015/0330116 | A1 | 11/2015 | Dente |
| 2019/0131818 | A1* | 5/2019 | Bryla ............... G01R 19/16528 |
| 2022/0194320 | A1* | 6/2022 | Caron .................... E05B 81/82 |

FOREIGN PATENT DOCUMENTS

| | | |
|---|---|---|
| DE | 102018100551 A1 | 7/2019 |
| EP | 2826938 A2 | 1/2015 |

\* cited by examiner

METHOD FOR OPERATING A MOTOR VEHICLE CLOSING SYSTEM

CROSS-REFERENCE TO RELATED APPLICATIONS

This application is the U.S. National Phase of PCT Application No. PCT/EP2020/086867 filed on Dec. 17, 2020, which claims priority to German Patent Application No. DE 10 2020 100 372.2, filed on Jan. 9, 2020, the disclosures of which are hereby incorporated in their entirety by reference herein.

TECHNICAL FIELD

The present disclosure relates to a motor vehicle closing system and a method of operating the same.

BACKGROUND

Motor vehicle closing systems may provide a number of types of motorized closing functions for closure elements of a motor vehicle. These include, in particular, motor vehicle locks for closure elements such as side doors, hatchbacks, tailgates, trunk lids, or engine hoods. These closure elements can be designed, in principle, as swing doors or sliding doors. Further examples of the relevant closing functions of a motor vehicle are drive systems that provide a motorized movement, in particular, of the aforementioned closure elements.

SUMMARY

The problem addressed by the present disclosure is to design and refine the known method for operating a motor vehicle closing system such that the monitoring of the state of the stored energy source is further improved. As an example, a forecast of the operability of the motor vehicle closing system is to be enabled.

In one or more embodiments, it is provided that, in the monitoring routine, a time dependency of a discharging variable of the stored energy source is determined by means of the monitoring unit in a discharging situation of the stored energy source and a safety routine for the stored energy source is triggered by means of the monitoring unit if a predefined fault criterion is satisfied by the time dependency of the discharging variable.

The provided approach therefore relates to a monitoring of a discharging situation of the stored energy source, in contrast to the known concept of a monitoring of the charging routine of the stored energy source. The time dependency of the discharging variable can be ascertained, such as, regardless of predefined charge cycles and also in comparison to the charging routine over a longer time period in order to increase the accuracy of the monitoring, which permits, for example, a forecast of the operability of the stored energy source.

A relatively simple ascertainment of the time dependency of the discharging variable is achieved, in that the discharging variable is representative of the voltage drop, of the discharge current, and/or of the internal resistance of the stored energy source. For example, voltage and/or current measuring systems also provided for the movement routine and/or the charging routine can be utilized in the monitoring routine, and so additional sensors are not absolutely necessary.

According to another embodiment, the time dependency of the discharging variable is determined via at least two discrete measuring times in a measuring time interval. In addition, if at least one measuring time coincides with a transfer of the motor vehicle closing system into a resting state and at least one measuring time coincides with a transfer of the motor vehicle closing system into an operating state, particularly long measuring time intervals can be achieved. In addition, it may be advantageous to detect any impairments of the stored energy source already during a transfer of the motor vehicle closing system into the operating state.

In one or more embodiments, at least one sub-criterion of the fault criterion is defined by the fact that the time dependency of the discharging variable deviates from a predefined target time dependency. Via the target time dependency, in particular, the temporal profile of the discharging variable in the discharging situation can be checked via the fault criterion, which improves the reliability of the monitoring.

For a relatively simple comparison of the time dependency of the discharging variable with the fault criterion, at least one sub-criterion of the fault criterion is defined by the fact that the discharging variable exceeds a predefined maximum discharge over the measuring time interval. As an example, a maximum discharge is predefined for each of various measuring time intervals, on the basis of which the fault criterion can be adapted to the particular measuring time interval. The time period of the measuring time interval until a predefined discharge has been reached can be compared to a minimum period of time.

In one embodiment, the discharging situation is established by a self-discharge of the stored energy source. If the discharging situation is brought about by a discharge process triggered by means of the monitoring unit, the accuracy of the monitoring can also be increased at shorter measuring time intervals. A predefined amount of energy can be withdrawn from the stored energy source via a balancing circuit of the capacitor, and so already present components of the closing system controller can be utilized for the discharge process.

As an example, when a forecast result for the stored energy source is generated in the safety routine by means of the monitoring unit on the basis of a comparison of the time dependency of the discharging variable with predefined discharge profiles and/or on the basis of a modeling of the time dependency of the discharging variable. Consequently, a possible impairment of the stored energy source can be detected and classified at an early point in time.

In another embodiment, a change of the control parameters of the movement routine and/or of the charging routine can be triggered in the safety routine by means of the monitoring unit. The operability of the motor vehicle closing system can therefore still be at least briefly maintained.

One or more embodiments, relate to an emergency operation in which a voltage supply via the stored energy source is ensured.

According to yet another embodiment, which has independent significance, the closing system controller provided for the method according to the present disclosure. Reference is made to all embodiments of the method according to the invention.

According to yet another embodiment, which also has independent significance, the motor vehicle closing system provided for the method according to the invention having a closing system controller according to the present disclosure is claimed as such. Reference is therefore also made to all embodiments of the method according to the invention.

BRIEF DESCRIPTION OF THE DRAWINGS

The invention is explained in the following in greater detail with reference to a drawing representing only one exemplary embodiment. In the drawing.

DETAILED DESCRIPTION

Figure 1:
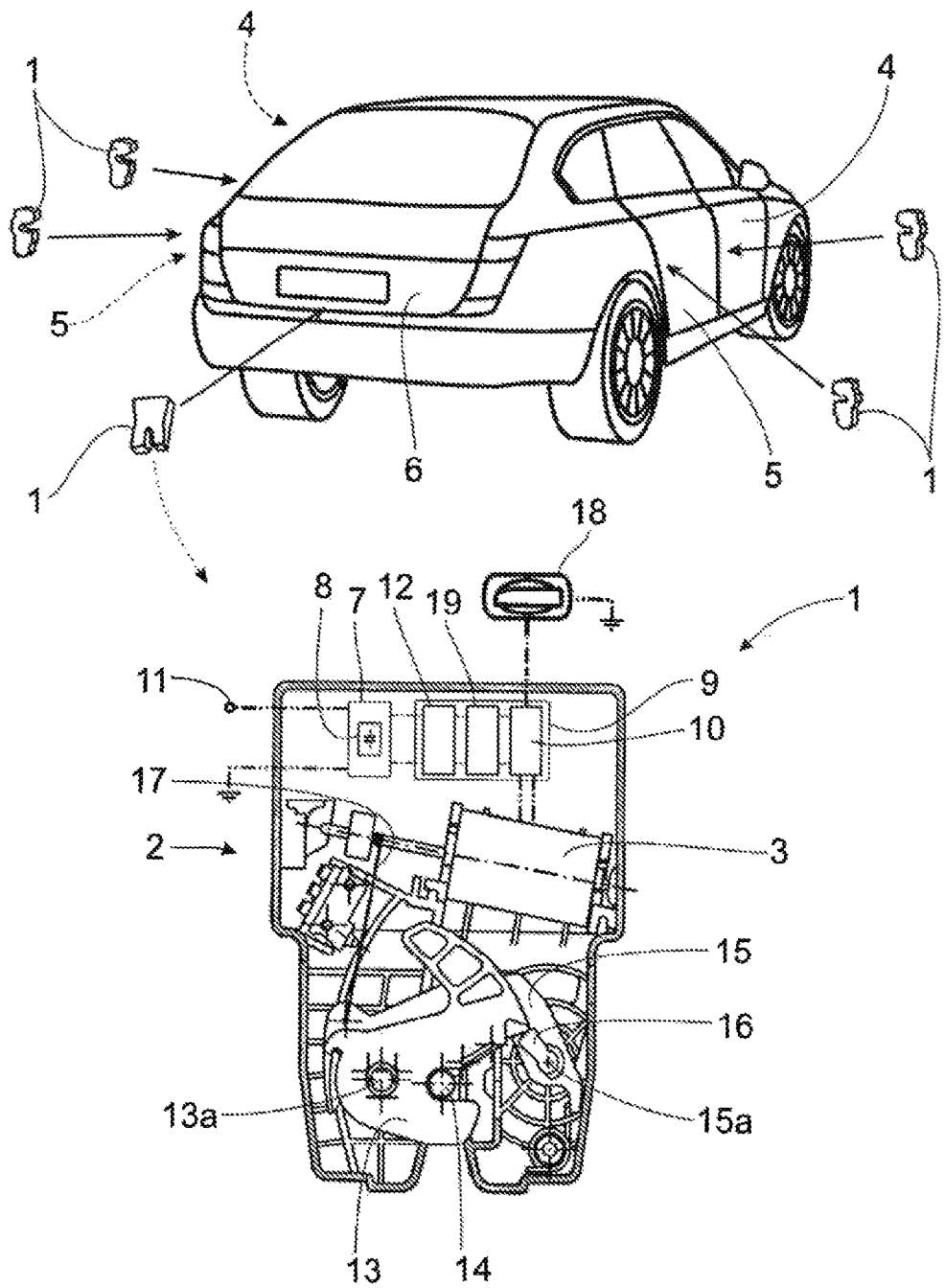
FIG. 1 shows a schematic, perspective representation of a motor vehicle having motor vehicle closing systems according to the invention in a partially disassembled side view.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known method of operating a motor vehicle closing system having a motor vehicle lock, which includes a latch and a pawl as the closure elements is disclosed in DE 20 2013 103 042 U1. The motor vehicle lock is usually arranged on the associated closure element, while a locking part is arranged so as to be fixed to the body. The latch can be brought into a closed position in which it is securely engaged with the locking part and in which it is fixed by the pawl. Moreover, the motor vehicle lock is equipped with an electric drive, with which the pawl is movable such that the latch, releasing the locking part, is movable into its open position.

In order to take the requirements on the reliability of the voltage supply to the electric drive into account, the known motor vehicle closing system is configured with a rechargeable stored energy source, in particular with a capacitor, for supplying voltage to the motor vehicle closing system, as the result of which an operation of the electric drive is ensured in order to enable a motorized disengagement of the pawl also during an emergency operation triggered by a predetermined emergency, in particular in the event of a failure of a central battery of the motor vehicle.

The rechargeable stored energy sources utilized in motor vehicle closing systems, in particular the capacitors of the stored energy source, have a limited service life, however. In addition, the performance of the stored energy sources are subjected to production-related variations. In the known method for operating a motor vehicle closing system (US 2015/0330116 A1), on which the invention is based, a monitoring unit is therefore provided for the stored energy source. On the basis of a monitoring of the charging routine of the stored energy source, for example, an increase of the leakage current or a drop of the capacitance of the stored energy source can be detected.

Due to the safety relevance of the power supply of the motor vehicle closing system via the rechargeable stored energy source, the need still exists, however, to detect a possible impairment of the stored energy source particularly early.

According to a first teaching, the present disclosure relates to a method for operating a motor vehicle closing system 1. The motor vehicle closing system 1 includes an electric drive 2 having an electric drive motor 3 for providing a motorized closing function.

A motorized closing function is to be understood in that a movable closure element 4, 5, 6 of the motor vehicle is moved directly or indirectly by a movement generated by the electric drive 2, for example, is opened or closed, and/or locked or unlocked. The exemplary embodiments of motor vehicle closing systems represented in FIG. 1 are assigned to the front side doors 4, the rear side doors 5, and the trunk lid 6. The motor vehicle closing systems 1 each include a motor vehicle lock for the particular closure element 4, 5, 6. Only one single motor vehicle closing system 1 is ever mentioned in the following. These explanations apply, in principle, for all other motor vehicle closing systems 1 shown in FIG. 1.

The motor vehicle closing system 1 includes a rechargeable stored energy source 7, here for example having a capacitor 8, for supplying voltage to the motor vehicle closing system 1, such as to the electric drive 2. The stored energy source can include at least one electrochemical stored energy source, for example, at least one battery having a primary cell and/or a secondary cell. The term "capacitor" is to be broadly understood in the present case. It includes a single capacitor or also a circuit arrangement made up of multiple capacitor elements.

The motor vehicle closing system 1 also includes a closing system controller 9. The closing system controller 9 is configured for activating the electric drive 2 and, here and for example, includes a drive control 10 for electronically implementing closing states, which takes over the activation of the electric drive 2 in order to provide the motorized closing function. The drive control 10 is for example configured for converting a supply voltage provided to the closing system controller 9, which is provided, regardless of an operating mode, by the electrical system voltage 11 of a central battery of the motor vehicle and/or by the rechargeable stored energy source 7, into a drive voltage for the electric drive 2. The central battery is for example, the battery that provides the electrical energy necessary for starting the motor vehicle.

When the supply voltage is provided by the rechargeable stored energy source 7, a discharge of the capacitor 8, such as, acts as the voltage source. The closing system controller 9 is also configured for charging the stored energy source 7 in a charging routine, wherein, here and for example, a charging controller 12 is provided for carrying out the charging routine. In the charging routine, a charge voltage is provided by means of the charging controller 12 for the stored energy source 7, such as for the capacitor 8, for example, via the electrical system voltage 11.

In one or more embodiments, the motor vehicle closing system 1 includes a motor vehicle lock, which is represented in FIG. 1 in a partially disassembled side view. The motor vehicle lock assigned to the motor vehicle closing system 1 is equipped with a latch 13, which is pivotable about a latch axis 13a, for the secure engagement with a locking part 14, and a pawl 15, which is assigned to the latch 13 and is pivotable about a pawl axis 15a. The locking part 14 can be a locking clamp, a locking bolt, or the like. For example, the motor vehicle lock is arranged on a closure element 4, 5, 6, while the locking part 14 is arranged on the motor vehicle so as to be fixed to the body.

The pawl 15 can be brought into an engaged position represented in FIG. 1, in which the pawl 15 holds the latch 13 in the represented closed position by means of a pawl prong 16. Moreover, the pawl 15 can be disengaged in a motorized manner by means of the electric drive 2. For this purpose, the drive motor 3 may be connected to the pawl 15 with a drive cable 17. The motorized disengagement of the pawl 15 is, in FIG. 1, a pivoting of the pawl 15 in the clockwise direction about the pawl axis 15*a*. In principle, the pawl 15 can also be an integral part of a pawl system made up of two or more sequentially arranged pawls and assigned to the latch 13.

The motorized disengagement of the pawl 15 is triggered, for example, by an actuation of a door handle 18. For this purpose, the door handle 18 is equipped with a sensor or the like, which detects an actuation of the door handle 18 and transmits the detection via a control-related connection to the closing system controller 1 and, here, to the drive control 10, which triggers an activation of the electric drive 2.

In addition to or instead of the closing function of the motor vehicle lock explained here in greater detail, the motor vehicle closing system 1 can also have a drive arrangement for the motorized movement of an aforementioned closure element 4, 5, 6 of the motor vehicle, wherein the drive arrangement is utilized for moving, such as opening and/or closing, the closure elements 4, 5, 6 by means of a motor. Further examples of closing functions are a motorized movement of operating elements such as operating levers, door handles, and of interior space elements and exterior space elements of the motor vehicle, such as ventilation elements, interior mirrors, side mirrors, lighting, and the like.

The closing system controller 9 includes a monitoring unit 19 for monitoring the stored energy source 7 in a monitoring routine. The monitoring unit 19 performs control-related tasks in the monitoring routine, which is explained in greater detail in the following.

As an example, in the monitoring routine, a time dependency of a discharging variable of the stored energy source 7 is determined by means of the monitoring unit 19 in a discharging situation of the stored energy source 7 and a safety routine for the stored energy source 7 is triggered by means of the monitoring unit 19 if a predefined fault criterion is satisfied by the time dependency of the discharging variable.

Here, values for the discharging variable can be ascertained by the monitoring unit 19 and/or obtained by the monitoring unit 19. The monitoring unit 19 determines the time dependency of the discharging variable, wherein, for example, values for the discharging variable are each assigned to a measuring time. The values for the discharging variable with the assigned measuring time are stored, such as, by the monitoring unit 19, for example, in a non-volatile data memory, which is assigned to the monitoring unit 19.

Figure 2:
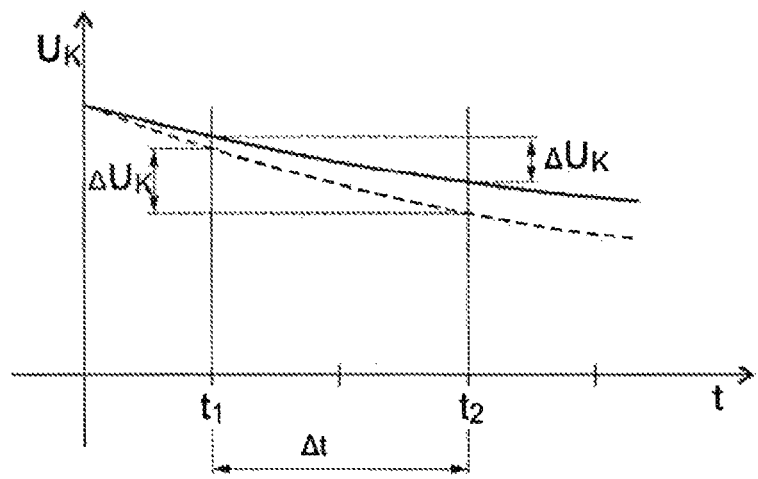
FIG. 2 shows a schematic representation of the time dependency of the discharging variable a) in a discharging situation established by a self-discharge and b) in a discharging situation brought about by a discharge process.
Figure 2:
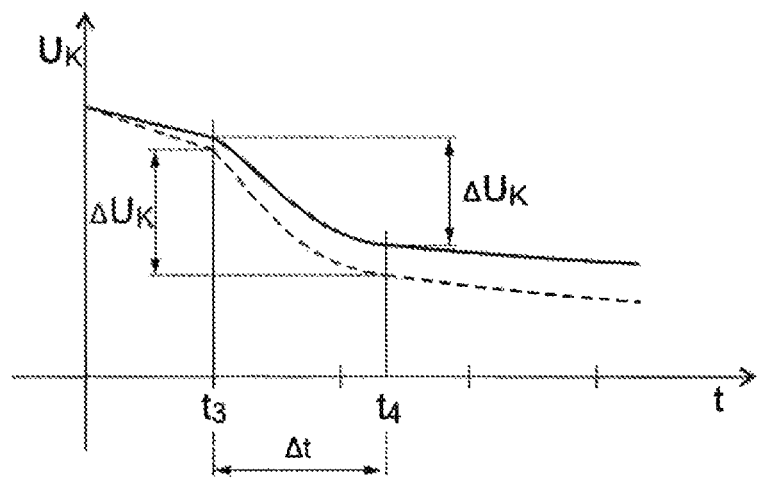

According to another embodiment, the discharging variable is representative of the voltage drop, of the discharge current, and/or of the internal resistance of the stored energy source 7. In FIG. 2, the drop $\Delta U_K$ of the capacitor voltage $U_K$ of the capacitor 8 over time t is represented by way of example. The discharge current and/or the internal resistance of the capacitor 8 can also be utilized as the discharging variable. Appropriate discharging variables can also be utilized for other elements of the stored energy source 7, for example, for a battery of the stored energy source 7.

As an example, the time dependency of the discharging variable is ascertained over at least one measuring time interval $\Delta t$ in the discharging situation. In addition, the time dependency of the discharging variable is determined by ascertaining the discharging variable at at least two discrete measuring times, in the exemplary embodiment shown in FIG. 2*a*), at two discrete measuring times $t_1$ and $t_2$, in the measuring time interval $\Delta t$. In one or more embodiments, it is the case here that at least one measuring time, specifically the measuring time $t_1$ in this case, coincides with a transfer of the motor vehicle closing system 1 into a resting state, and at least one measuring time, such as the measuring time $t_2$ in this case, coincides with a transfer of the motor vehicle closing system 1 into an operating state. In this way, a long measuring time interval $\Delta t$ can be achieved and the check of the fault criterion can be carried out already at the start of the operating state. It is also conceivable that a continuous determination of the time dependency of the discharging variable is at least partially carried out in the monitoring routine.

In FIG. 2*a*), two exemplary time dependencies of the discharging variable are shown. The time dependency represented by the solid line represents an intact capacitor 8. The time dependency represented by the dashed line, however, represents a capacitor 8 that has been adversely affected, for example, due to aging effects or production errors. For both represented time dependencies, a drop of the capacitor voltage $U_K$ over time is observed in the discharging situation due to the discharge of the capacitor 8. With respect to the impaired capacitor 8, however, as compared to the intact capacitor 8, there is a considerably faster drop $\Delta U_K$ of the capacitor voltage $U_K$ and another profile of the time dependency, which is identifiable by the shape of the curve.

The monitoring unit 19 checks the ascertained time dependency of the discharging variable to determine whether the predefined fault criterion has been satisfied. At least one sub-criterion of the fault criterion is representative, such as, of the fact that the time dependency of the discharging variable deviates from a normal operation state of the stored energy source 7. According to one preferred embodiment, at least one sub-criterion of the fault criterion is defined by the fact that the time dependency of the discharging variable deviates from a predefined target time dependency. The target time dependency represents, for example, the shape of the curve of the time dependency of the capacitor voltage $U_K$ for an intact capacitor 8 shown in FIG. 2*a*). If the time dependency of the discharging variable ascertained in the monitoring routine deviates, for example, by a predefined maximum deviation from the target time dependency being exceeded at one or multiple measuring time(s), the sub-criterion of the fault criterion is considered to have been satisfied.

In a relatively simple embodiment represented in FIG. 2, at least one sub-criterion of the fault criterion is defined by the fact that the discharging variable exceeds a predefined maximum discharge over the measuring time interval. Here and as an example, the drop $\Delta U_K$ of the capacitor voltage UK is determined at the measuring times $t_1$, $t_2$ and compared with a predefined maximum discharge. In one or more embodiments, a maximum discharge is predefined for each of various measuring time intervals, for example, depending on the time period $\Delta t$ of the measuring time interval.

At least one sub-criterion of the fault criterion is defined in one further preferred embodiment by the fact that, with the discharging variable, a predefined discharge is achieved within a measuring time interval, the time period $\Delta t$ of which falls below a predefined minimum time period. For example, a value for the drop $\Delta U_K$ of the capacitor voltage $U_K$ is predefined for the exemplary embodiments represented in FIG. 2, wherein the time period $\Delta t$ until this discharge has been reached is ascertained. If the time period $\Delta t$ falls below the predefined minimum time period, the sub-criterion is considered to have been satisfied.

According to another embodiment, the discharging situation represented in FIG. 2a) is established by a self-discharge of the stored energy source 7. The stored energy source 7 is not actively discharged in this case, but rather a self-discharge due to a leakage current or the like is present in the measuring time interval $\Delta t$.

According to another embodiment, the discharging situation is brought about by a discharge process triggered by means of a monitoring unit 19. This discharging situation is shown in FIG. 2b), wherein the time dependency represented with the solid line represents an intact capacity 8 and the time dependency represented with the dashed line represents an impaired capacitor 8. The discharge process is an active discharge of the stored energy source 7, wherein, for example, a predefined amount of energy is withdrawn from the stored energy source 7, such as with a predefined temporal profile of the discharge. The predefined amount of energy may be withdrawn from the stored energy source 7 via a balancing circuit of the capacitor 8. The balancing circuit forms a portion of a charging circuit of the charging controller 12 for the capacitor 8, which is configured for a voltage compensation of the charging voltage of individual capacitor elements. The fault criterion is at least partially predefined on the basis of the discharge process, for example, as a function of the charge withdrawn from the stored energy source 7, of the discharge current, or the like. In the exemplary embodiment from FIG. 2b), the drop $\Delta U_K$ of the capacitor voltage $U_K$ at the measuring times $t_3$, $t_4$ is compared with a maximum discharge predefined for the discharge process.

In the safety routine, measures are generally taken to ensure the reliability of the motor vehicle closing system 1 also in the event of an impairment of the stored energy source 7. In the safety routine, a forecast result for the remaining service life of the stored energy source 7 until the complete discharge has occurred and/or for the remaining service life of the stored energy source 7 is generated, such as, by means of the monitoring unit 19 on the basis of a comparison of the time dependency of the discharging variable with predefined discharge profiles and/or on the basis of a modeling of the time dependency of the discharging variable. A "complete discharge" is understood in this case to be a reduction of the amount of stored energy to a predefined minimum level, wherein the stored energy source does not necessarily need to be free of all stored energy.

For example, a categorization of the state of the stored energy source 7 can be achieved on the basis of the comparison with predefined discharge profiles, wherein a forecast result is assigned to the particular discharge profile. The modeling of the time dependency can be, for example, a mathematical model, for example, in one simple embodiment, a curve adaptation on the basis of a model function for the time dependency, wherein further parameters, such as the temperature of the stored energy source 7, can also be incorporated therein. The categorization and/or modeling are/is carried out, such as, on the basis of the above-described discharge process.

According to another embodiment, control parameters, which are stored, for example, in the closing system controller 9, are predefined for the aforementioned movement routine and the charging routine. A change of the control parameters can be triggered in the safety routine by means of the monitoring unit 19 in order to adapt the movement routine and the charging routine to the state of the stored energy source 7. As an example, the control parameters are changed at least such that the charging voltage to be utilized in the charging routine is increased as compared to a charging voltage for normal operation. For example, the maximum charging voltage provided for the stored energy source 7 is utilized as the charging voltage in order to bring about a charging of the stored energy source that is as complete as possible. In the movement routine, the drive power of the electric drive 2 to be utilized can be reduced as compared to a drive power for normal operation. For example, a slower motorized movement is accepted in order to enable a further operation of the motor vehicle closing system 1.

In one or more embodiments, a storage of a piece of fault information in a fault memory (not represented) of the motor vehicle and/or the output of a warning signal to the motor vehicle operator are/is triggered in the safety routine by means of the monitoring unit 19. The fault memory can be designed as a central fault memory of the motor vehicle 3, for example, as part of the central motor vehicle steering controller. The fault memory can also be assigned to the control arrangement 9. The warning signal can be output to the operator as a visual and/or acoustic warning signal.

The course of the safety routine may be predefined depending on the above-described forecast result. If, for example, only one slight impairment of the stored energy source 7 exists, which continues to enable the operation of the motor vehicle closing system, the change of the control parameters can be triggered and/or the fault information can be stored. If, however, such an impairment of the stored energy source 7 exists such that the further operation of the motor vehicle closing system is no longer absolutely ensured, the aforementioned warning signal can be output, for example. In addition, it is conceivable that, in the case of a substantial impairment of the stored energy source 7, at least a portion of the functions of the motor vehicle closing system is deactivated or blocked, which represents a safety risk in the event of failure of the stored energy source 7.

According to another embodiment, the supply voltage of the motor vehicle closing system 1 is provided via a central battery of the motor vehicle by means of the closing system controller 9 in a normal operation and at least a portion of the power output to the motor vehicle closing system 1 is provided via the stored energy source 7 by means of the closing system controller 9 in an emergency operation. As an example, the closing system controller 9 detects a reduction of the electrical system voltage 11 of the central battery and, in the case that the electrical system voltage 11 drops below a limit voltage, provides an electrical connection to the rechargeable stored energy source 7.

In another embodiment, the capacitor 8 includes at least one double-layer capacitor. A double-layer capacitor is an electrochemical stored energy source. The energy storage takes place in an electrochemical double layer, which is also known as a "Helmholtz layer" ("Lexikon—Aktuelle Fachbegriffe aus Informatik and Telekommunikation", 9th edition, 2007, VDF Hochschulverlag AG, page 86). Such a double-layer capacitor is also referred to as a "supercapacitor", "supercap", "ultracap", or the like. A double-layer capacitor can provide a high power density for the motor vehicle closing system 1.

According to a further teaching, which is significant in and of itself, the aforementioned closing system controller 9 for operating a motor vehicle closing system 1 as such is claimed. The motor vehicle closing system 1 includes an electric drive 2 having an electric drive motor 3 for providing a motorized closing function for a movable closure element 4, 5, 6 of a motor vehicle, wherein the motor vehicle closure system 1 includes a rechargeable stored energy source 7 having a capacitor 8 for supplying voltage to the motor vehicle closure system 1, such as to the electric drive 2, wherein the motor vehicle closure system 1 includes a closing system controller 9 for activating the electric drive 2 in a movement routine and for charging the stored energy source 7 in a charging routine, wherein the closing system controller 9 includes a monitoring unit 19 for monitoring the stored energy source 7 in a monitoring routine. It is essential here that the monitoring unit 19 determines a time dependency of a discharging variable of the stored energy source 7 in the monitoring routine in a discharging situation of the stored energy source 7 and that the monitoring unit 19 triggers a safety routine for the stored energy source 7 if a predefined fault criterion is satisfied by the time dependency of the discharging variable. Reference is made to all embodiments of the method according to the invention.

According to a further teaching, which is significant in and of itself, the above-described motor vehicle closing system 1 as such is claimed. The motor vehicle closure system 1 includes an electric drive 2 having an electric drive motor 3 for providing a motorized closing function for a movable closure element 4, 5, 6 of a motor vehicle, wherein the motor vehicle closure system 1 includes a rechargeable stored energy source 7 having a capacitor 8 for supplying voltage to the motor vehicle closure system 1, such as to the electric drive 2, and a closing system controller 9 according to the invention. As an example, the motor vehicle closing system 1 is configured for carrying out the method according to the invention. Reference is also made to all embodiments of the method according to the invention.

According to another embodiment, the motor vehicle closure system 1 includes a motor vehicle lock for a movable closure element 4, 5, 6 of the motor vehicle, wherein the motor vehicle lock is equipped with latch 13 for the secure engagement with a locking part 14 and a pawl 15, which is assigned to the latch 13, and wherein the electric drive 2 is provided for the motorized disengagement of the pawl 15. Reference is also made, in this regard, to the comments made with respect to the method according to the invention and to the aforementioned description of the motor vehicle lock.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMBERS

1 motor vehicle closing system
2 electric drive
4 closure element
5 closure elements
6 closure elements
7 energy source
8 intact capacitor
8 capacitor
9 control arrangement
10 drive control
11 electrical system voltage
12 controller
13 latch
14 locking part
15 pawl
16 pawl prong
17 drive cable
18 door handle
19 monitoring unit
13a latch axis
15a pawl axis While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A method for of operating a motor vehicle closing system, wherein the motor vehicle closing system includes an electric drive, provided with an electric drive motor configured to provide a motorized closing function for a movable closure element of a motor vehicle, a rechargeable stored energy source, configured to supply voltage to the motor vehicle closing system, a closing system controller configured to activate the electric drive perform a movement routine and perform a charging routine, in which a stored energy source is charged, wherein the closing system controller includes a monitoring unit configured to perform a monitoring routine, in which the stored energy source is monitored, the method comprising:
    performing the monitoring routine, including determining, by the monitoring unit, a time dependency of a discharging variable of the stored energy source as the stored energy source is discharging energy; and
    triggering, by the monitoring unit, a safety routine for the stored energy source, in response to a specified fault criterion being satisfied by the time dependency of the discharging variable.

2. The method of claim 1, wherein the discharging variable is representative of a voltage drop of the discharging energy.

3. The method of claim 1, wherein the performing step includes determining the time dependency of the discharging variable over at least one measuring time interval as the stored energy source is discharging energy.

4. The method of claim 1, further comprising:
    defining at least one sub-criterion of the specified fault criterion in response to the time dependency of the discharging variable deviating from a predefined target time dependency.

5. The method of claim 1, further comprising:
    defining at least one sub-criterion of the fault criterion in response to the discharging variable exceeding a predefined maximum discharge over a measuring time interval.

6. The method of claim 1, further comprising:
    self-discharging, by the stored energy source, the stored energy source and/or triggering, by the monitoring unit, the discharging of the stored energy source, in which a predefined amount of energy is withdrawn from the stored energy source, wherein the fault criterion is at least partially predefined based on the discharging of the stored energy source.

7. The method of claim 1, wherein, the safety routine includes, generating a forecast result for the remaining service life of the stored energy source until a complete discharge and/or forecasting, by the monitoring unit, the remaining service life of the stored energy source in which the monitoring unit compares the time dependency of the discharging variable with predefined discharge profiles and/or on a modeling of the time dependency of the discharging variable.

8. The method of claim 1, further comprising:
triggering, by the monitoring unit during the safety routine, a change of control parameters, wherein the control parameters are predefined for the movement routine and the charging routine.

9. The method of claim 1, further comprising:
storing, by the monitoring unit during the safety routine, a piece of fault information in a fault memory of the motor vehicle.

10. The method of claim 1, further comprising:
providing, by the closing system controller in a normal operation, the voltage of the motor vehicle closing system via a central battery of the motor vehicle; and
providing, by the closing system controller in an emergency operation, at least a portion of a power output to the motor vehicle closing system via the stored energy source.

11. A motor vehicle closing system comprising:
an electric drive including an electric drive motor configured to provide a motorized closing function for a movable closure element of a motor vehicle;
a rechargeable stored energy source configured to supply voltage to the electric drive
a controller configured to activate the electric drive during a movement routine and charge the stored energy source during a charging routine,
a monitoring unit configured to perform a monitoring routine, in which the stored energy source is monitored, wherein
the monitoring unit is configured to determine a time dependency of a discharging variable of the stored energy source during the monitoring routine in while the stored energy source is discharging energy, and wherein the monitoring unit is configured to trigger a safety routine for the stored energy source in response to a predefined fault criterion being satisfied by the time dependency of the discharging variable.

12. The method of claim 1, wherein the discharging variable is representative of an internal resistance of the stored energy source.

13. The method of claim 12, wherein the stored energy source includes a capacitor, and the discharging variable is representative of an internal resistance of the capacitor.

14. The motor vehicle closing system of claim 11, wherein the time dependency of the discharging variable is determined by ascertaining the discharging variable at at least two discrete measuring times during a measuring time interval.

15. The motor vehicle closing system of claim 14, wherein a first measuring time, of the at least two measuring times, coincides with a transfer of the motor vehicle closing system to a resting state and a second measuring time, of the at least two measuring times, coincides with a transfer of the motor vehicle closing system to an operating state.

16. The motor vehicle closing system of claim 11, further comprising:
a capacitor including a balancing circuit, wherein the monitoring unit is configured to withdraw a predefined amount of energy from the balancing circuit.

17. The method of claim 1, further comprising:
outputting, by the monitoring unit during the safety routine, a warning signal to a motor vehicle operator.

18. A method of operating a motor vehicle closing system, the method comprising:
activating, by a controller, an electric drive to perform a movement routine and a charging routine, in which a stored energy source is charged;
determining, by a monitoring unit, a time dependency of a discharging variable of the stored energy source as the stored energy source is discharging energy; and
triggering, by the monitoring unit, a safety routine for the stored energy source, in response to a specified fault criterion being satisfied by the time dependency of the discharging variable.

19. The method of claim 18, further comprising:
triggering, by the monitoring unit, the discharging of the stored energy source, in which a predefined amount of energy is withdrawn from the stored energy source.

20. The method of claim 18, further comprising:
forecasting, by the monitoring unit, a remaining service life of the stored energy source in which the monitoring unit compares the time dependency of the discharging variable with predefined discharge profiles.

* * * * *